United States Patent [19]
Bates et al.

[11] Patent Number: 5,620,368
[45] Date of Patent: Apr. 15, 1997

[54] FORCED CLIMATE VENTILATOR

[75] Inventors: Thomas M. Bates; Larry W. Wyatt, both of Virginia Beach, Va.

[73] Assignee: R.T.R. Credit, Inc., Virginia Beach, Va.

[21] Appl. No.: 375,472

[22] Filed: Jan. 19, 1995

[51] Int. Cl.⁶ .................................................... F24F 7/06
[52] U.S. Cl. ...................... 454/186; 236/44 C; 236/49.3
[58] Field of Search .................................. 454/185, 186, 454/239, 252, 909; 236/44 C, 49.3

[56] References Cited

U.S. PATENT DOCUMENTS

| | | | |
|---|---|---|---|
| 3,049,067 | 8/1962 | Claude | 454/186 |
| 3,952,947 | 4/1976 | Saunders . | |
| 4,051,999 | 10/1977 | Granger . | |
| 4,123,002 | 10/1978 | Saunders . | |
| 4,182,401 | 1/1980 | Pinnell | 165/2 |
| 4,244,519 | 1/1981 | Zornig | 126/430 |
| 4,251,026 | 2/1981 | Siegel . | |
| 4,263,894 | 4/1981 | Zebuhr | 126/430 |
| 4,373,573 | 2/1983 | Madwed | 165/2 |
| 4,437,511 | 3/1984 | Sheridan | 165/485 |
| 4,462,334 | 7/1984 | Kim | 119/16 |
| 4,498,526 | 2/1985 | Arenas | 165/45 |
| 4,505,327 | 3/1985 | Angle . | |
| 4,651,805 | 3/1987 | Bergeron | 165/1 |
| 4,741,391 | 5/1988 | Schmitz | 165/56 |
| 4,870,832 | 10/1989 | Crawley | 62/89 |
| 4,905,579 | 3/1990 | Dame . | |
| 5,092,520 | 3/1992 | Lestage | 454/343 X |
| 5,121,789 | 6/1992 | Scharfe | 165/48.2 |
| 5,209,286 | 5/1993 | Schmidt | 165/45 |
| 5,243,804 | 9/1993 | Sarazen, Jr. | 236/44 C |

FOREIGN PATENT DOCUMENTS

| | | | |
|---|---|---|---|
| 61-213431 | 9/1986 | Japan | 454/186 |
| 62-294833 | 12/1987 | Japan | 454/186 |

OTHER PUBLICATIONS

George R. Drake, *Weatherizing Your Home*, Reston Publishing Company, Inc., Reston, Virginia, 1978, pp. 122–125, 198, 199, 210–225, 232–247.

*Primary Examiner*—Harold Joyce
*Attorney, Agent, or Firm*—Robert E. Bushnell, Esq.

[57] ABSTRACT

A method and apparatus for ventilating a building comprises an air duct extending between an attic and a basement or crawl space through an occupiable portion of the building. The duct has no openings within the occupied portion of the building, the occupied portion being substantially isolated from the transfer of air to and from either the attic or the basement or crawl space. An exhaust fan extracts hot air from the attic to the atmosphere, while a duct fan replaces the air in the attic with cool, humid air from the basement or crawl space. The crawl space or basement is replenished through exterior openings in the building to the atmosphere. A thermostat and humidistat control the operation of the fans in response to environmental conditions within the attic. A detector can shut down the fans if radon is detected in the duct.

26 Claims, 4 Drawing Sheets

FORCED CLIMATE VENTILATOR

FIELD OF THE INVENTION

The present invention relates to ventilation and dehumidification of buildings, and more particularly, to processes and apparatus for continuously regulating variable ambient conditions of architectural structures.

BACKGROUND OF THE INVENTION

The problem of excessive heat build-up in an attic, defined as an enclosed space separating the roof of an architectural structure from an intermediate occupiable space, has long been known. The roofing material absorbs solar energy and conducts the heat to the interior rafters and decking of the attic, which in turn heat the air in the attic. Although air from the attic is generally not circulated through the living quarters, the trapped heat can penetrate insulation in the attic floor and heat the ceilings below, consequently raising the air temperature in the occupiable space. Without adequate air circulation in the attic, attic temperature can rise to 160° F. on a hot, sunny day, substantially increasing the load on the air conditioning system for the space within the dwelling occupiable by human beings.

Contemporary methods of addressing this problem include natural and powered ventilation, or a combination of both. Natural ventilation often uses a "stack" effect, relying upon air flow caused by the difference in elevation between the lowest and highest portions of the attic. In one exemplary structure, screened openings are made in the roof near the peak and at the base, usually in the ridge and soffit, respectively. Warmer, lighter air rises to the top of the attic and is forced out of the opening near the peak by cooler, heavier outside air entering through the lower openings in the soffit.

Powered systems commonly use an electrically powered fan to expel hot air trapped in the attic. The expelled air is then replaced by outside air through the openings in the soffit, such as those described above. *Attic Ventilation Control System* in U.S. Pat. No. 4,251,026 to Siegel et al., provides a thermostatic control which activates an exhaust fan when the attic temperature reaches a predetermined point. The *Positive Ventilation Cooling Augmenter* of U.S. Pat. No. 4,870,832 to Crawley provides a collector and duct mounted above the heat exchanger of a home air conditioner. The system uses the exhaust pressure from the fan blowing external air across the heat exchanger, in combination with adiabatic expansion, to pressure-ventilate the attic. In each of the systems the outside air may itself be only sightly cooler than the air already within the attic, thereby limiting the cooling effect available.

Like the attic, a crawl space or basement located beneath the upper portions of the architectural structure typically occupied by human beings also requires good ventilation in the humid summer months, but for a different reason. A generally cooler temperature exists in such spaces, resulting primarily from the insulating effect provided by the occupied portions of the structure above the basement or crawl space, and the heat sink provided by the earth. The relative humidity of air, defined as the ratio of the amount of water vapor actually in the air to the greatest amount of water vapor that can theoretically be held in the air at the same temperature, increases as it enters the basement or crawl space and begins to cool. At lower temperatures, the maximum amount of water vapor the air can hold decreases and any excess moisture condenses on cooler surfaces, resulting in mildew and in extreme cases rotting wood, rusted metal, and cracked plaster. The *Household Dehumidifier* of U.S. Pat. No. 5,092,520 to Lestage has a humidity controlled fan installed in a duct, for exhausting the coolest, dampest air from a basement or crawl space to the outside. No beneficial use, however, is made of the naturally cooled air. The *Supplemental Heating and Cooling System* of U.S. Pat. No. 4,182,401 to Pinnell et al. circulates cool air between a basement and a living space in the cooling season to reduce the load on an air conditioning system, but fails to beneficially use that same cool air to affect attic temperatures.

A number of patents show specially built solar heated structures which utilize the earth as a heat sink, or substitute a thermal storage chamber insulated from the earth and made from dense materials such as concrete or rock, in order to cool air within the structure. For example, the *Solar Efficient Structure* of U.S. Pat. No. 4,498,526 to Arenas provides a closed system for circulating air between an occupied space and an attic through a duct network positioned in thermal contact with the ground. Since the cooled air is exhausted to both the attic and the occupied space however, a dehumidifier is required to insure against condensation in the attic and excessive humidity in the occupied space.

Similarly, the *Environmentally Heated and Cooled Building* of U.S. Pat. No. 4,501,999 to Granger et al. shows a rock bed thermal storage chamber insulated from the earth, having a duct and fan network for circulating air through a previously cooled storage chamber in order to cool the attic and occupied space (mode 6). Prior to using the storage chamber to cool the air however, the rock bed must have been prepared by passing cool outside air through it (mode 8), since the chamber is insulated from the earth as a heat sink. An alternative operation for warm days (mode 5), draws outside air directly into the occupied space and attic without passing it through the storage chamber, again requiring that the outside air be relatively cool.

The *Warm Climate Solar Building* of U.S. Pat. No. 5,121,789 to Scharf also uses a thermal storage device comprising a duct network embedded in a concrete slab insulated from the earth. Cool night time air is drawn from outside the structure through the duct network and into an attic by a timer controlled fan. During hot summer days however, the fan is shut off and the outside air intake is closed, resulting in little or no cool air flowing into the attic. The occupied space is cooled through conduction of heat to the slab itself.

Each of the above described solar structures utilize cooling systems which would be difficult and cost prohibitive to install in an existing structure, and which fail to provide for dehumidification of a basement or crawl space.

In recent years it has been discovered that in some areas of the country naturally occurring radon seeps from the soil and tends to accumulate in basement areas. Radon gas is radioactive and a known carcinogen when inhaled by humans. A dangerous condition can occur if the radon gas is permitted to become concentrated within an occupied area. If air containing high levels of radon gas is drawn into the attic, it could leak into the occupied areas of the building.

SUMMARY OF THE INVENTION

Accordingly, it is an object of the present invention to reduce the load on a building air conditioning system by efficiently cooling the attic.

Another object is to reduce the temperature within an attic by importing cool air from a basement or crawl space without creating excessively humid conditions in the attic, while at the same time reducing the humidity in the basement or crawl space.

A further object is to provide a relatively inexpensive system for removing moist air from a crawl space or basement and for cooling an attic, which can be retrofit to existing structures using existing "off the shelf" building materials.

It is yet another object to provide a system for dehumidifying a basement or crawl space using substantially less electrical power than a conventional room dehumidifier.

These and other objects of the present invention may be achieved in a first aspect by a duct providing a closed conduit accommodating the transfer of air between an attic and a crawl space or basement of a building. An aperture in the top of the duct permits air to exit from the duct along a lowermost level of the attic in order to prevent condensation from occurring. A fan forcibly expels air from within an uppermost level of the attic to the exterior of the building.

In a second aspect an additional fan is also provided to forcibly urge the transfer of air through the duct. A thermostat and a humidistat automatically control operation of the fans in response to environmental conditions within the attic. A detector may optionally be provided to disable the fans if radon is detected in the duct.

In a third aspect, the invention comprises a method of ventilating a building by transferring air wholly within a building via a duct extending between an attic and a lowermost portion of a building. Operational power is provided to a first fan exhausting air from the attic to the atmosphere and a second fan forcing the air transferred via the duct along a lowermost stratum of the attic.

BRIEF DESCRIPTION OF THE DRAWINGS

A more complete appreciation of this invention, and many of the attendant advantages thereof, will be readily apparent as the same becomes better understood by reference to the following detailed description when considered in connection with the accompanying drawings in which the reference symbols indicate the same of similar components, wherein.

DETAILED DESCRIPTION OF THE INVENTION

Figure 1:
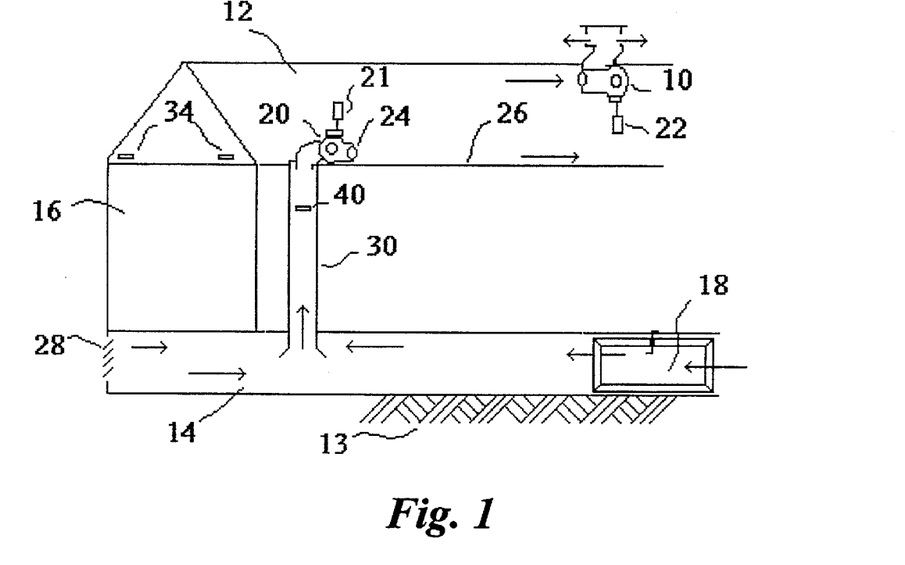
FIG. 1 is a schematic view of a building showing an embodiment of the present invention installed therein.

Turning now to the drawings and referring first to FIG. 1, in a first embodiment a duct 30 is installed in an architectural structure, with one end of duct 30 opening into a crawl space 14 and a second end of duct 30 opening into attic 12, essentially completely bypassing space 16 suitable for use as residential living quarters or to be otherwise occupied by human beings. In essence, duct 30 isolates the fluid (e.g., atmospheric air flowing between the crawl space (or basement) 14 and attic 12. As hereinafter used, the term 'occupied space' refers to those portions of a building which are above ground and are occupied in normal daily use by human beings, while the terms 'basement' or 'crawl space' are used synonymously to refer to the lowermost portion of the building, often extending below ground level, notwithstanding that a basement may be 'finished' or otherwise serviceable for use by the occupants of the building. The basement or crawl space 14 serves to separate the occupied space from the ground or earth 13.

Air within a structure will tend to stratify according to temperature as a result of well known thermodynamic principles, resulting from warmer, lighter air being forced upward by cooler denser air. In a typical structure, there are numerous cracks and small openings where the previously described stack effect can force air to travel between the various levels of the structure, despite attempts to insulate the occupied space from the attic and crawl space. Also, outside air may leak into the occupied space through electrical outlets and around windows, as a result of the positive or negative pressures created by the air movement caused by the stack effect. In an occupied space having conditioned air, such leaks detrimentally affect the ability of the air conditioner to maintain a constant temperature.

In the present invention, duct 30 provides a closed conduit between an attic 12 and a crawl space 14, which accommodates air movement due to the stack effect along a path which is much less restrictive than one through incidental openings in an occupied space 16. Accordingly, the present invention reduces the natural air movement through the occupied space caused by the stack effect, providing a corresponding reduction in the leakage of conditioned air within an occupied space.

Accommodation of air movement between attic 12 and crawl space 14 also serves to improve the ability to control the air temperature within the attic, while at the same time reducing the relative humidity within the crawl space. A ventilator such as exhaust fan 10 is mounted through an opening in the roof of attic 12 to forcibly expel hot air from the attic. Exhaust fan 10 creates a negative pressure within attic 12, dramatically increasing the movement of cool, moist air from crawl space 14 into the attic via duct 30 over that which occurs due to the stack effect alone. Accordingly, exhaust fan 10 expands the outside temperature range within which the present invention can maintain a desired attic temperature, while selective operation of exhaust fan 10 enables operational control of attic temperature. Crawl space 14 should enclose a volume of air of no more than approximately one order of magnitude smaller than the volume of air enclosed by attic 12, in order that outside air entering crawl space 14 have an opportunity to cool prior to being drawn into attic 12.

Exhaust fan 10 should preferably be located so that it draws only the hottest air, from the highest portion of the attic, in order to maximize the cooling efficiency for a given air change rate. While attic exhaust fans rated from 1000–4000 cubic feet per minute (CFM) are commonly available for single family homes, a fan capable of providing a minimum of ten air changes per hour for the volume enclosed should be selected. In a prototype system of the preferred embodiment, a fourteen inch attic exhaust fan rated to move 1480 CFM was selected for an attic of approximately 4500 cubic feet, in order to provide roughly twenty air changes per hour. The actual quantity of air moved by a fan will differ from the rated value in dependance upon restrictions in the influx of air to replace that which is exhausted, and upon environmental changes affecting the weight of air, such as temperature, humidity, and barometric pressure.

A second ventilator, such as duct fan 20 of the type commonly available for use with air conditioning or heating systems to boost airflow within ducts in remote portions of a building, may be mounted at the end of duct 30, in order to facilitate the transfer of cool air from the crawl space into the attic. Provision in this second embodiment of a second fan forcing air into the attic reduces the negative pressure in the attic created by exhaust fan 10, consequently reducing the chance of conditioned air being drawn from occupied space 16 and assuring that exhaust fan 10 can operate near its rated value.

Also, the present invention reduces humidity levels in the attic and crawl space by increasing kinetic energy levels and by exhausting moist air from the crawl space to the attic and to the outside. Duct fan 20 increases kinetic energy levels of air enclosed in the attic by circulating the air within the attic. When existing attic vents 34 are left open to entry of outside air, selective operation of the second ventilator relative to the first ventilator permits control over attic humidity levels by altering the mixture of air entering the attic from the crawl space 14 with air from the outside.

In the prototype system, a twelve inch duct fan was selected with a rating of 1200 CFM for a crawl space of approximately 3240 cubic feet, resulting in roughly twenty-two air changes per hour within the crawl space. Crawl space 14 should be provided with exterior openings of a size sufficient to permit entry of outside air to replace the air drawn to the attic from the crawl space by duct fan 20. The openings, at least one of which may be created by replacing a crawl space access door with a screen 18, should ideally be located on opposing sides of the crawl space in order to assure thorough ventilation of the crawl space. Thermostatically operated louvers 28 may be placed over the openings to restrict entry of outside air into the crawl space when the outside temperature drops below a predetermined level, such as 40° F.

Outlet 24 of duct 30, through duct fan 20, is preferably located adjacent the floor 26 of attic 12, in an orientation such that air traveling though duct 30 from crawl space 14 exits along the plane of attic floor 26. Such an orientation is preferable because it lessens the disturbance of the stratified air within the attic 12. Condensation occurs when hot air comes into contact with cool, moist air. The present invention permits the relatively cool air from the crawl space to slowly mix with the stratified air in the attic, contacting the lower, cooler portions first and minimizing the temperature differential. Also, directing the cool air from crawl space 14 first along attic floor 26 minimizes the amount of heat transferred from attic 16 through the floor materials to the ceilings of the occupied space 16 located immediately below.

Figure 2:
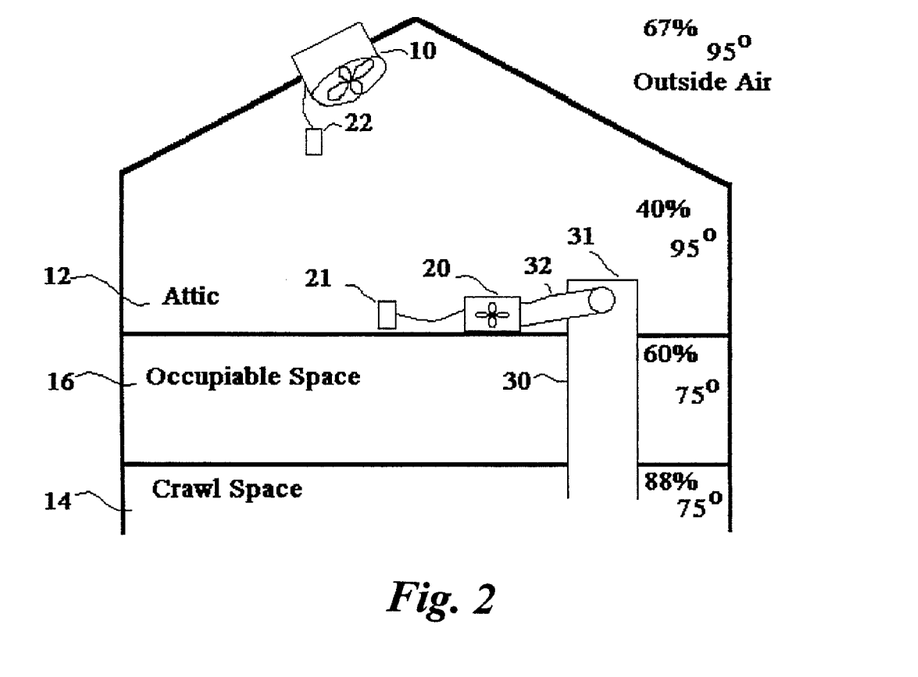
FIG. 2 is a diagram illustrating temperature and humidity variations which may be found in a building.

FIG. 2 illustrates the variance in temperature and humidity which can be found within a building in which an embodiment of the present invention is operating. While an outside temperature may be 95° F. at a relative humidity of 67%, a crawl space 14 open to the outside may experience much higher humidity due to the naturally cooler temperatures found within the crawl space. The environment within an occupied space 16 may be artificially maintained by an air conditioning system, at 75° F. for example, but an attic 12 can experience unacceptably high temperatures without adequate ventilation. The present invention maintains the attic temperature within 5–10 degrees of the outside temperature, and substantially reduces the humidity within the crawl space without correspondingly increasing the attic humidity to unacceptable levels.

Duct 30 may comprise both a rigid portion 31 and flexible portion 32. In one embodiment, rigid portion 31 is preferably formed from 10 inch by 4 inch rectangular stock due to its durability and cost. When the system is retrofit to an existing structure, rigid portion 31 may be extended through occupied space 16 inside a closet or otherwise placed out of sight. Flexible portion 32 may be formed from 6 inch round, flexible stock in order to simplify placement of duct fan 20. In an existing structure, it may not be feasible to install the duct through the occupied space 16 so as to open into the attic 12 at an opposite end from exhaust fan 10. Accordingly, flexible portion 32 may be used to extend the rigid portion 31 of the duct to a location where stagnant air spaces are minimized. The size and shape of the duct may be also be varied in order to accommodate aesthetically pleasing installation within occupied space 16, or to alter the air change rate in dependance upon the size of the attic to be cooled.

Figure 3A:
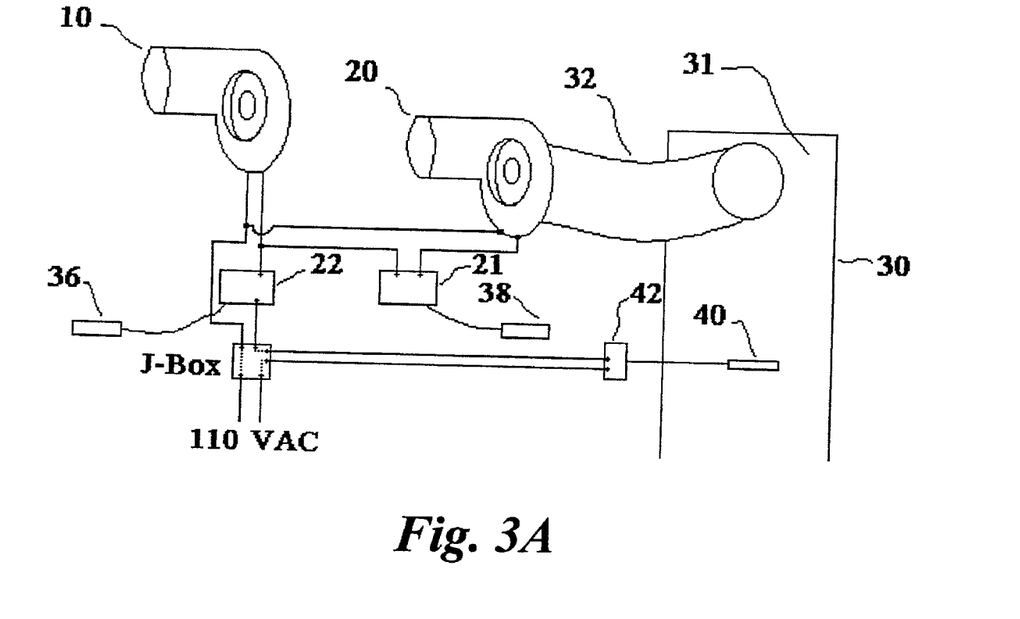
FIGS. 3A and 3B are schematic diagrams of a control circuit constructed according to the principles of the present invention.
Figure 3B:
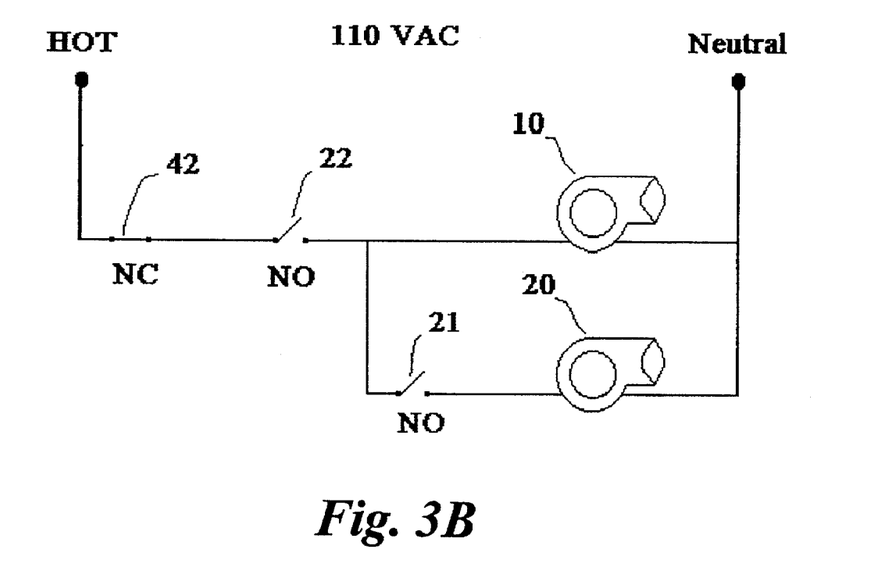

FIGS. 3A and 3B show one control system suitable for practice of the present invention. Referring first to FIG. 3A, electrical power is applied to exhaust fan 10 via a thermostat 22, then to booster fan 20 via humidistat 21. Both thermostat 22 and humidistat 21 each have a corresponding sensor, 36 and 38 respectively, for detecting ambient temperature and relative humidity. The sensors 36 and 38 may be enclosed within the same housings as thermostat 22 and humidistat 21 or alternatively space apart, but should be located in attic 12 so as to sense the temperature and humidity therein.

Referring now to FIG. 3B, the hot lead of a 110 Volt source of alternating current is applied to exhaust fan 10 though thermostat 22, comprising a normally open temperature actuated switch. Humidistat 21, comprising a normally open humidity actuated switch, is connected in series with thermostat 22 to supply electrical power to duct fan 20. Both thermostat 22 and humidistat 21 may be set by the user to a desired actuation temperature and humidity shut-off level.

In a preferred embodiment, thermostat 22 is set to close whenever the temperature in the attic exceeds 75° F., and humidistat 21 is set to close so long as the relative humidity in the attic remains below 80%. In a normal operation of this embodiment, thermostat 22 provides electrical power to both exhaust fan 10 and duct fan 20 when the attic temperature rises above 75° F. Humidistat 21 interrupts electrical power to duct fan 20 if the humidity in the attic increases above 80%, while the exhaust fan 10 continues to run, in order to temporarily reduce the flow of damp air from the crawl space.

Most existing attic vents 34 (FIG. 1) may be left unblocked so as to alter the mixture of outside air and crawl space air drawn into the attic in dependance on the operation of duct fan 20, as previously described. Alternatively attic vents 34 may all be sealed, so as to increase the air flow through duct 30, in those climates where the danger of the humidity in the attic reaching 80% is considered minimal.

In an alternative embodiment, the control system is additionally provided with a radon detector 40, for actuating a normally closed relay 42 connected in series with thermostat 22. Radon detector 40 may be located inside duct 30 to detect the presence of radon gas in the air passing through the duct. Normally closed relay 42 breaks the electrical connection between an electrical source and the remainder of the control circuit if radon is detected, in order to disable the system until the severity of contamination can be determined and abatement measures put in place. Radon detection is a valuable safety protection for any building located in a region of the country where it is commonly found, but is a particularly important feature in the practice of the present invention because of the increased circulation of air from the lower portion of the building via a duct running through the occupied space.

Figure 4:
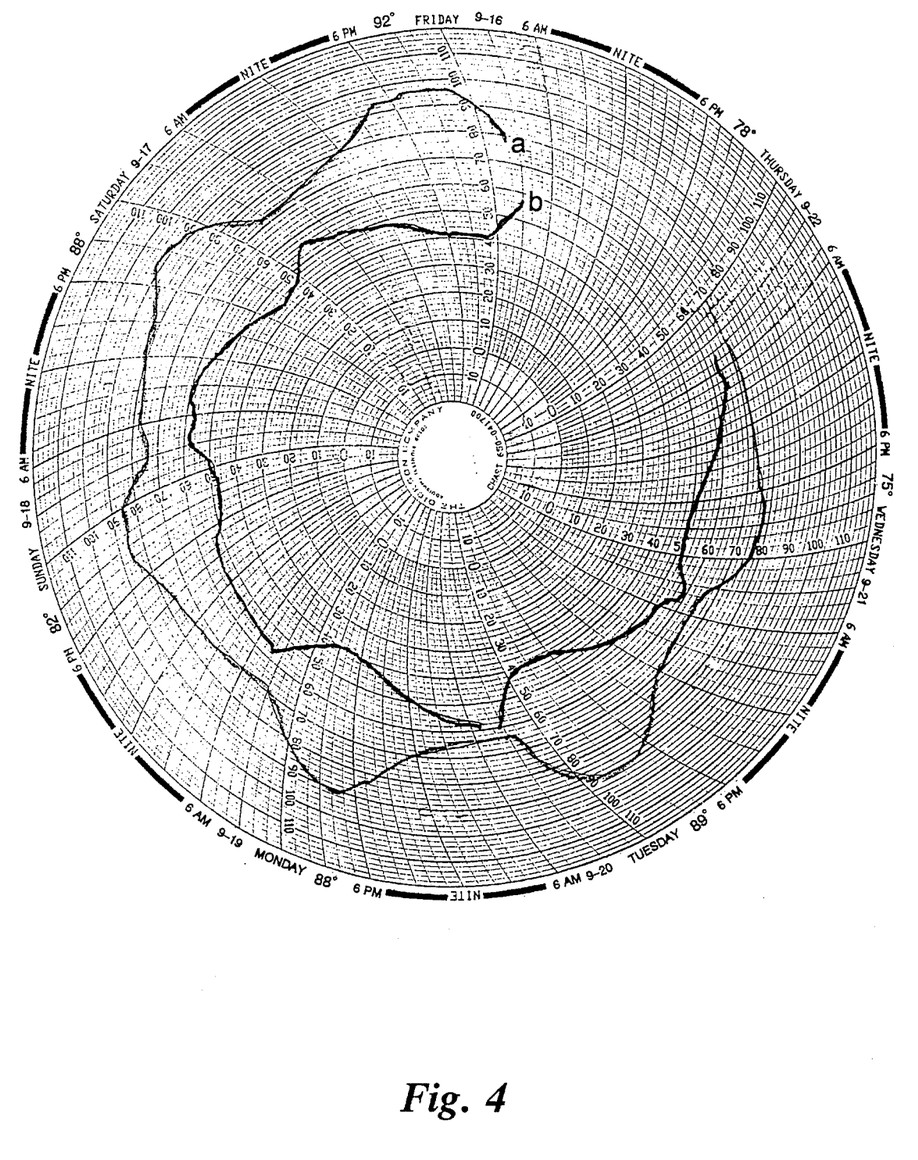
FIG. 4 is a chart recording measuring temperature and humidity in the crawl space of a building equipped with an embodiment of the present invention, showing measurements taken over the course of a week.
Figure 5:
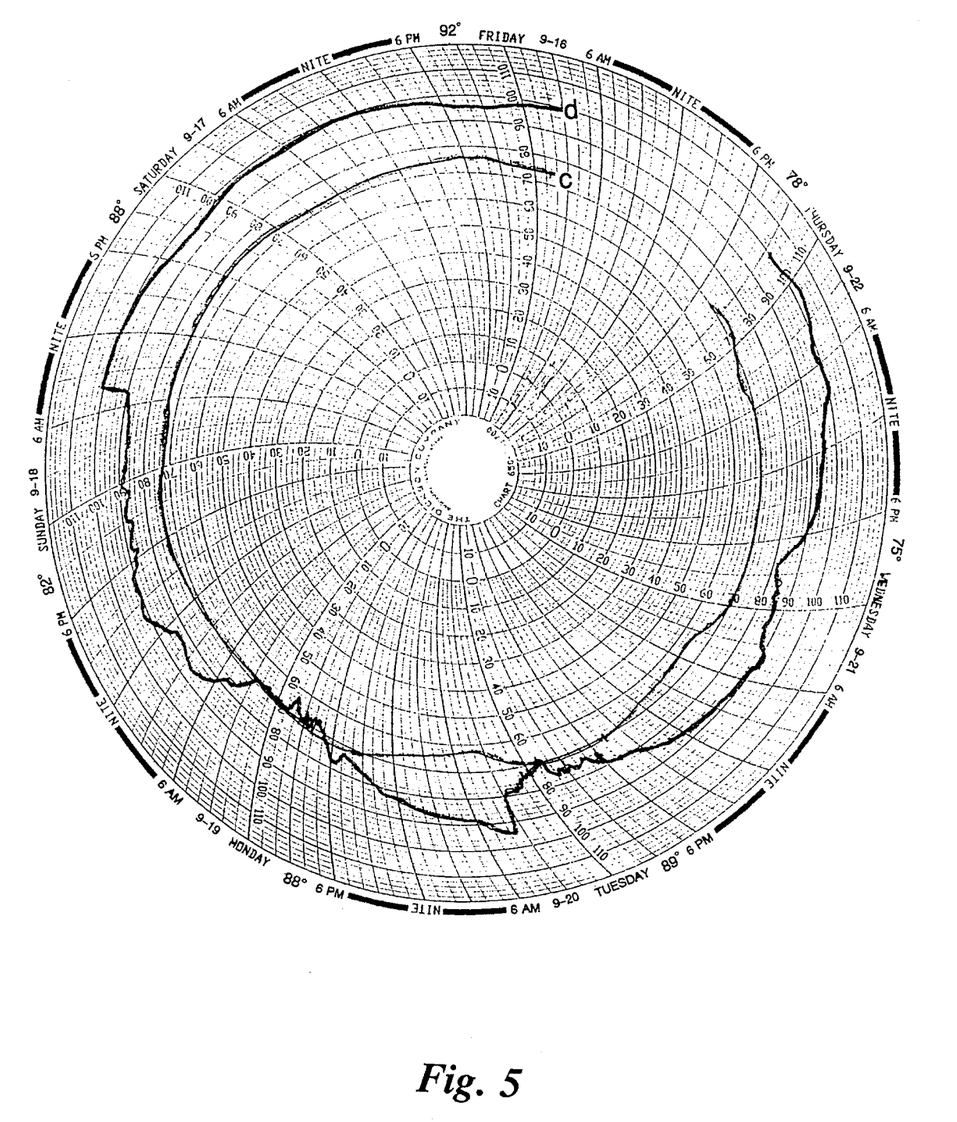
FIG. 5 is a chart recording measuring temperature and humidity in the attic of a building equipped with an embodiment of the present invention, showing measurements taken over the course of a week.

The advantages of the system of the present invention may be seen with reference to FIGS. 4 and 5, which are chart recordings of temperature and humidity readings taken over the course of a week in September, in a building having a prototype of the present invention installed therein. FIG. 4 has two lines a and b, representing respectively temperature and humidity in the attic recorded continuously over the course of a week. The peak outside temperature and date were recorded along the outside circumference of the chart next to each day. FIG. 5 also shows two lines c and d, representing respectively temperature and humidity recorded in the crawl space over the same week.

The fans began operating at approximately 9:00 each morning, and were manually shut off each evening. Peak outside temperatures generally occurred by 4:00 each afternoon, after which the outside humidity in the seaside location where the prototype was installed began to rise beyond the ability of the system to completely maintain the humidity reduction achieved during the day.

The table below illustrates significant data extracted from the chart. Temperatures are in degrees Fahrenheit. The first two days of data, September 16 and 17, were not used because it was determined that the chart recorder for the crawl space had been erroneously placed in a location having insufficient air flow to accurately record changes in humidity. After being moved to a more central location in the crawl space, the recorder immediately began displaying the expected variations. Also, differences in length between the arms holding the temperature and humidity pens resulted in an apparent "lag" of about an hour in the humidity measurements recorded in lines b and d. In other words, humidity measured at 9:00 AM was recorded at a location corresponding to 8:00 AM.

As can be seen, the temperature in the crawl space remained relatively constant at approximately 70° F. due to the insulating effect of the building above and the heat sink created by the earth below, regardless of the rise in outside temperature during the day. The relative humidity measured in the crawl space, however, was reduced during the course of the day anywhere from 2% on September 18, to 18% on September 20.

Prior to the installation of the present invention, attic temperatures would reach 120°–130° F. on a sunny day with a peak outside temperature of 90° F. After the invention was in place and operating, the attic temperature remained within 5°–10° F. of the outside temperature, substantially reducing the load on the air conditioning system. Significantly, the attic relative humidity also was reduced during the course of the day by between 8 and 18 percent, despite the addition of air from the crawl space having a much greater relative humidity.

The reduction in humidity achieved is dependant on outside conditions. For example, on cooler days the thermostat will not operate the fans as often, and on rainy days the outside air drawn into the crawl space can reach 100% humidity, negating much of the effect. It was found that the crawl space had a distinct odor of mildew which disappeared within two weeks of installation and operation of the embodiment, and the wood in the crawl space appeared noticeably drier.

The temperature and humidity reductions described were achieved using materials having a total cost of less than about five hundred dollars. Substantial reductions in air conditioning energy costs can be realized with the present invention, in which each fan uses about the same amount of electricity as a one hundred watt light bulb. Furthermore, it has been found that the reduction in air movement through the occupied space due to the stack effect, achieved by provision of a duct bypassing the occupied space, also reduces heating energy costs during mildly cold outside temperatures.

It is understood that various changes may be made without departing from the principle of the present invention. For example, duct fan 20 may be relocated to a position within or at the lower end of duct 30. Also, the size and type of fan may be varied according to availability and size of the attic and crawl space to be ventilated. A timer or additional controller sensing the humidity in the crawl space may be added, connected in parallel with humidistat 21, to temporarily suspend the deactivation of duct fan 20 when extremely humid conditions are encountered.

Accordingly, it is understood that the foregoing description is presented by way of example and is not intended to limit the scope of the invention, except as provided in the appended claims.

| Date/Time | Peak Outside Temperature | Attic Temperature | Attic Humidity | Crawl Space Temperature | Crawl Space Humidity |
| --- | --- | --- | --- | --- | --- |
| 9-18\9:00 AM | 82° | 74° | 58% | 72° | 88% |
| 9-18\4:00 PM | 82° | 88° | 48% | 74° | 86% |
| 9-19\9:00 AM | 88° | 68° | 58% | 70° | 76% |
| 9-19\4:00 PM | 88° | 90° | 40% | 72° | 64% |
| 9-20\9:00 AM | 89° | 65° | 58% | 65° | 94% |
| 9-20\4:00 PM | 89° | 92° | 40% | 72° | 76% |
| 9-21\9:00 AM | 75° | 68° | 58% | 66° | 92% |
| 9-21\4:00 PM | 75° | 78° | 50% | 70° | 82% |

I claim:

1. A forced climate ventilator, comprising:

an exhaust fan positioned to extract and to exhaust to atmosphere air drawn from a first enclosed space located immediately below the roof of a building and above an occupiable portion of the building;

a duct providing a closed conduit between the first enclosed space and a second enclosed space, said second enclosed space located below the occupiable portion of the building and separating the occupiable portion from earth and having a plurality of openings to atmosphere, said duct accommodating transfer of air between the first and second enclosed spaces;

a duct fan having an intake side positioned to draw air through said duct from said second enclosed space and having a discharge side positioned to exhaust the air along a lowermost stratum of the first enclosed space; and temperature sensing means for controlling application of operational power to said exhaust fan and to said duct fan whenever the temperature in the first enclosed space exceeds a predetermined temperature.

2. The forced climate ventilator of claim 1, further comprising:

first humidity sensing means for deactivating said duct fan whenever the relative humidity in the first enclosed space exceeds a first predetermined value.

3. The forced climate ventilator of claim 2, further comprising:

radon detection means for disabling said exhaust fan and said duct fan whenever radon is detected in said duct.

4. The forced climate ventilator of claim 2, further comprising:

second humidity sensing means for electrically bypassing said first humidity sensing means whenever the relative humidity in the second enclosed space exceeds a second predetermined value.

5. The forced climate ventilator of claim 1, further comprising the first enclosed space enclosing a volume differing from the volume enclosed by the second enclosed space by no more than one order of magnitude.

6. The forced climate ventilator of claim 2, further comprising:

said temperature sensing means comprising a thermostat adjustable by a user to set said predetermined temperature; and said first humidity sensing means comprising a thermostat adjustable by a user to set said first predetermined value.

7. The forced climate ventilator of claim 1, further comprising said first enclosed space comprising an attic of the building, and said second enclosed space comprising one of a basement and a crawl space of the building.

8. The forced climate ventilator of claim 1, further comprising said exhaust fan, said duct and said duct fan changing the air within each of said first and second enclosed spaces a plurality of times each hour.

9. The forced climate ventilator of claim 1, further comprising said duct terminating with a first end having a single opening within a lowermost stratum of said second enclosed space, extending through said occupiable space without break, and terminating with a second end having a single opening into said second enclosed space.

10. The forced climate ventilator of claim 1, said duct comprising:

a rigid portion extending between said first and second enclosed spaces; and a flexible portion extending from a terminus of said rigid portion along a lowermost stratum of said first enclosed space to an inlet of said duct fan, said duct fan being laterally located in said first enclosed space at an opposite end from said exhaust fan.

11. The forced climate ventilator of claim 1, further comprised of:

first humidity sensing means for deactivating said duct fan whenever the relative humidity in the first enclosed space exceeds a first predetermined value; and second humidity sensing means for electrically bypassing said first humidity sensing means whenever the relative humidity in the second enclosed space exceeds a second predetermined value.

12. A method for ventilating a building, comprising:

transferring air wholly within the building via a duct extending between an attic, comprising an enclosed space immediately below a roof separating the attic from atmosphere and above an intermediate occupiable portion of a building, and a lowermost portion of the building separating the intermediate occupiable portion of the building from earth, while bypassing said intermediate occupiable portion of the building;

providing operational power to a first fan exhausting air from within the attic to the outside of the building; and providing operational power to a second fan forcing air through said duct and along a lowermost stratum of the attic.

13. The method for ventilating a building of claim 12, further comprising:

performing said step of providing operational power to said first and second fans whenever the temperature in the attic exceeds a first value.

14. The method for ventilating a building of claim 12, further comprising:

performing said step of providing operational power to said first fan whenever the temperature in the attic exceeds a first value; and performing said step of providing operational power to said second fan whenever the temperature in the attic exceeds said first value and the relative humidity in the attic is less than a second value.

15. The method for ventilating a building of claim 12, further comprising:

disabling said first and second fans whenever radon is detected in the duct.

16. The method for ventilating a building of claim 12, said transferring step further comprising:

substituting air within the attic for air within the crawl space at a rate of a plurality of air changes per hour; and replacing said crawl space air with air drawn from outside said building through openings in said crawl space at a rate of a plurality of air changes per hour.

17. A forced climate ventilator comprising:

duct means for accommodating the transfer of air between an attic and a crawl space of a building, said duct means providing a closed conduit extending continuously through an occupiable portion of the building intermediate the attic and crawl space, said duct means having only a first aperture in a portion of said duct means extending into the crawl space permitting entry of air from the crawl space into said duct means, and a second aperture in a portion of said duct means extending into the attic permitting exit of air from said duct means into said attic, said second aperture being located adjacent a lowermost level of the attic; and first fan means for forcibly expelling air from within an uppermost strata of the attic to the outside of the building through at least one opening in a roof of the building.

18. The forced climate ventilator of claim 17, further comprising:

second fan means for forcibly urging air between the crawl space and the attic through said duct means.

19. The forced climate ventilator of claim 18, further comprising:

control means for activating said first fan means when the temperature within the attic exceeds a predetermined temperature, and for activating said second fan means when a temperature within the attic exceeds a predetermined temperature and a humidity within the building is less than a predetermined value.

20. The forced climate ventilator of claim 15, further comprising:

radon detection means for disabling said first fan means and said second fan means whenever radon is detected in said duct means.

21. A forced climate ventilator, comprising:

an exhaust fan having an intake orifice positioned to extract and to exhaust to atmosphere air drawn from a first enclosed space located immediately below the roof of a building and above an occupiable portion of the building;

a duct having a first orifice positioned within the first enclosed space and having a second orifice positioned within a second enclosed space providing a closed continuous conduit extending between the first enclosed space and said second enclosed space with a first section of said duct being positioned within said first enclosed space perforated by a first orifice and a second section of said duct being positioned within said second enclosed space providing a second orifice accommodating passage of air from the second enclosed space and into said duct, said second enclosed space being located below the occupiable portion of the building and separating the occupiable portion from earth and having a plurality of openings to atmosphere, said duct accommodating transfer of air between the first and second enclosed spaces;

a duct fan having an intake side connected to said first orifice to draw air through said duct from said second enclosed space and having a discharge side positioned within said first enclosed space separate and spaced-apart from said exhaust fan to exhaust the air along a lowermost stratum of the first enclosed space; and temperature sensing means for controlling application of operational power to said exhaust fan and to said duct fan whenever the temperature in the first enclosed space exceeds a predetermined temperature.

22. A forced climate ventilator, comprising:

first fan having an intake orifice positioned to extract and to exhaust to atmosphere air drawn from a first enclosed space located immediately below the roof of a building and above an occupiable portion of the building;

a duct having a first orifice positioned within the first enclosed space and having a second orifice positioned within a second enclosed space providing a closed continuous conduit extending between the first enclosed space and said second enclosed space with a first section of said duct being positioned within said first enclosed space perforated by a first orifice and a second section of said duct being positioned within said second enclosed space providing a second orifice accommodating passage of air from the second enclosed space and into said duct, said second enclosed space being located below the occupiable portion of the building and separating the occupiable portion from earth and having a plurality of openings to atmosphere, said duct accommodating transfer of air between the first and second enclosed spaces;

a second fan having an intake side positioned to draw air through said duct from said second enclosed space and a discharge side positioned to discharge the air drawn through said duct along a lowermost stratum of the first enclosed space;

temperature sensing means for controlling application of operational power to said first fan and to said second fan whenever the temperature in the first enclosed space exceeds a predetermined temperature; and humidity sensing means for deactivating said second fan whenever the relative humidity within the first enclosed space exceeds a predetermined value.

23. The forced climate ventilator of claim 22, further comprising:

said temperature sensing means comprising a thermostat adjustable by a user to set said predetermined temperature; and said humidity sensing means comprising a thermostat adjustable by a user to set said predetermined value.

24. A forced climate ventilator, comprising:

first fan having an intake orifice positioned to extract and to exhaust to atmosphere air drawn from a first enclosed space located immediately below the roof of a building and above an occupiable portion of the building;

a duct having a first orifice positioned within the first enclosed space and having a second orifice positioned within a second enclosed space providing a closed continuous conduit extending between the first enclosed space and said second enclosed space with a first section of said duct being positioned within said first enclosed space perforated by a first orifice and a second section of said duct being positioned within said second enclosed space providing a second orifice accommodating passage of air from the second enclosed space and into said duct, said second enclosed space being located below the occupiable portion of the building and separating the occupiable portion from earth and having a plurality of openings to atmosphere, said duct accommodating transfer of air between the first and second enclosed spaces;

a second fan positioned to draw air through said duct from said second enclosed space and to discharge the air drawn through said duct along a lowermost stratum of the first enclosed space; and control means for activating said first fan when the temperature within the attic exceeds a predetermined temperature, and for activating said second fan when the temperature within the first enclosed space exceeds said predetermined temperature and humidity within the building is less than a predetermined value.

25. The ventilator of claim 24, with said control means comprising:

temperature sensing means for controlling application of operational power to said first fan and to said second fan whenever the temperature within the first enclosed space exceeds said predetermined temperature;

first humidity sensing means for deactivating said second fan whenever the relative humidity in the first enclosed space exceeds said predetermined value; and second humidity sensing means for electrically bypassing said first humidity sensing means whenever the relative humidity in the first enclosed space exceeds a second value.

26. The ventilator of claim 25, further comprising:

said temperature sensing means comprising a thermostat adjustable by a user to set said predetermined temperature; and said first humidity sensing means comprising a humidistat adjustable by a user to set said predetermined value.

* * * * *